United States Patent
Yu

(10) Patent No.: US 9,742,273 B2
(45) Date of Patent: Aug. 22, 2017

(54) POWER SWITCHING VOLTAGE REGULATOR

(71) Applicant: Fitipower Integrated Technology, Inc., Hsinchu (TW)

(72) Inventor: Shang-Cheng Yu, Hsinchu (TW)

(73) Assignee: Fitipower Integrated Technology, Inc., Hsinchu (TW)

( * ) Notice: Subject to any disclaimer, the term of this patent is extended or adjusted under 35 U.S.C. 154(b) by 87 days.

(21) Appl. No.: 14/528,025

(22) Filed: Oct. 30, 2014

(65) Prior Publication Data

US 2015/0115915 A1   Apr. 30, 2015

(30) Foreign Application Priority Data

Oct. 31, 2013 (TW) .............................. 102139646 A

(51) Int. Cl.
*H02M 3/158* (2006.01)
*H02M 3/156* (2006.01)

(52) U.S. Cl.
CPC ......... *H02M 3/158* (2013.01); *H02M 3/1588* (2013.01); *H02M 2003/1566* (2013.01); *Y02B 70/1466* (2013.01)

(58) Field of Classification Search
CPC ........ H02M 3/08; H02M 3/145; H02M 3/155; H02M 3/156; H02M 3/1563; H02M 3/1566; H02M 3/157; H02M 3/158; H02M 3/1588; H02M 2001/0032; H02M 2001/0048; H02M 2001/0054; H02M 2001/0058; H02M 1/08; H02M 1/32; H02M 3/00; H02M 3/02; H02M 3/04; H02M 3/10; H02M 2003/1566; H02M 2001/0016; H02M 2001/0029; H02M 2001/0038; Y02B 70/00; Y02B 70/10; Y02B 70/14; Y02B 70/1458; Y02B 70/1466; Y02B 70/16
USPC ........ 323/222–226, 271–277, 282–288, 351, 323/234, 311, 312; 363/50–54, 89, 363/123–127; 361/18, 78, 79, 88–92
See application file for complete search history.

(56) References Cited

U.S. PATENT DOCUMENTS

| | | | |
|---|---|---|---|
| 2008/0007241 A1 | 1/2008 | Isham | |
| 2008/0061757 A1* | 3/2008 | Khayat | H02M 3/157 323/283 |

(Continued)

FOREIGN PATENT DOCUMENTS

| | | |
|---|---|---|
| CN | 201117719 | 9/2008 |
| TW | 201136119 A1 | 10/2011 |

*Primary Examiner* — Timothy J Dole
*Assistant Examiner* — Carlos Rivera-Perez
(74) *Attorney, Agent, or Firm* — Steven Reiss

(57) ABSTRACT

A power switching voltage regulator includes a high-side switch, a low-side switch, an inductor, a detection circuit, and a gate voltage adjusting unit. The high-side switch is coupled to a voltage source; the low-side switch is coupled between the high-side switch and a ground. A connection node is located between the high-side switch and the low-side switch. The inductor is coupled between the connection node and a power output terminal of the power switching voltage regulator. The detection circuit detects an output voltage of the power output terminal, when the output voltage swings out of a predetermined range. The gate voltage adjusting unit dynamically adjusts a gate voltage on-resistances of the high-side switch and the low-side switch.

20 Claims, 3 Drawing Sheets

(56) References Cited

U.S. PATENT DOCUMENTS

| | | | | |
|---|---|---|---|---|
| 2011/0169463 A1* | 7/2011 | Yang | ................. | H02M 3/155 |
| | | | | 323/271 |
| 2011/0241641 A1* | 10/2011 | Chen | ................. | H02M 3/1588 |
| | | | | 323/284 |
| 2012/0306469 A1* | 12/2012 | Shono | ................. | H02M 1/08 |
| | | | | 323/311 |

* cited by examiner

POWER SWITCHING VOLTAGE REGULATOR

CROSS-REFERENCE TO RELATED APPLICATIONS

This application claims priority to Taiwanese Patent Application No. 102139646 filed on Oct. 31, 2013, the contents of which are incorporated by reference herein.

FIELD

The disclosure generally relates to power switching voltage regulators.

BACKGROUND

A power switching voltage regulator supplies power for a microprocessor or a memory. The power switching voltage regulator includes a high-side switch and a low-side switch. When the power switching voltage regulator supplies power for a load by turning on the high-side switch or the low-side switch, the output voltage of the power switching voltage regulator swings due to changes of a current applied to the load, and a stability of the power switching voltage regulator is reduced.

BRIEF DESCRIPTION OF THE DRAWINGS

Implementations of the present technology will now be described, by way of example only, with reference to the attached figures.

DETAILED DESCRIPTION

Figure 1:
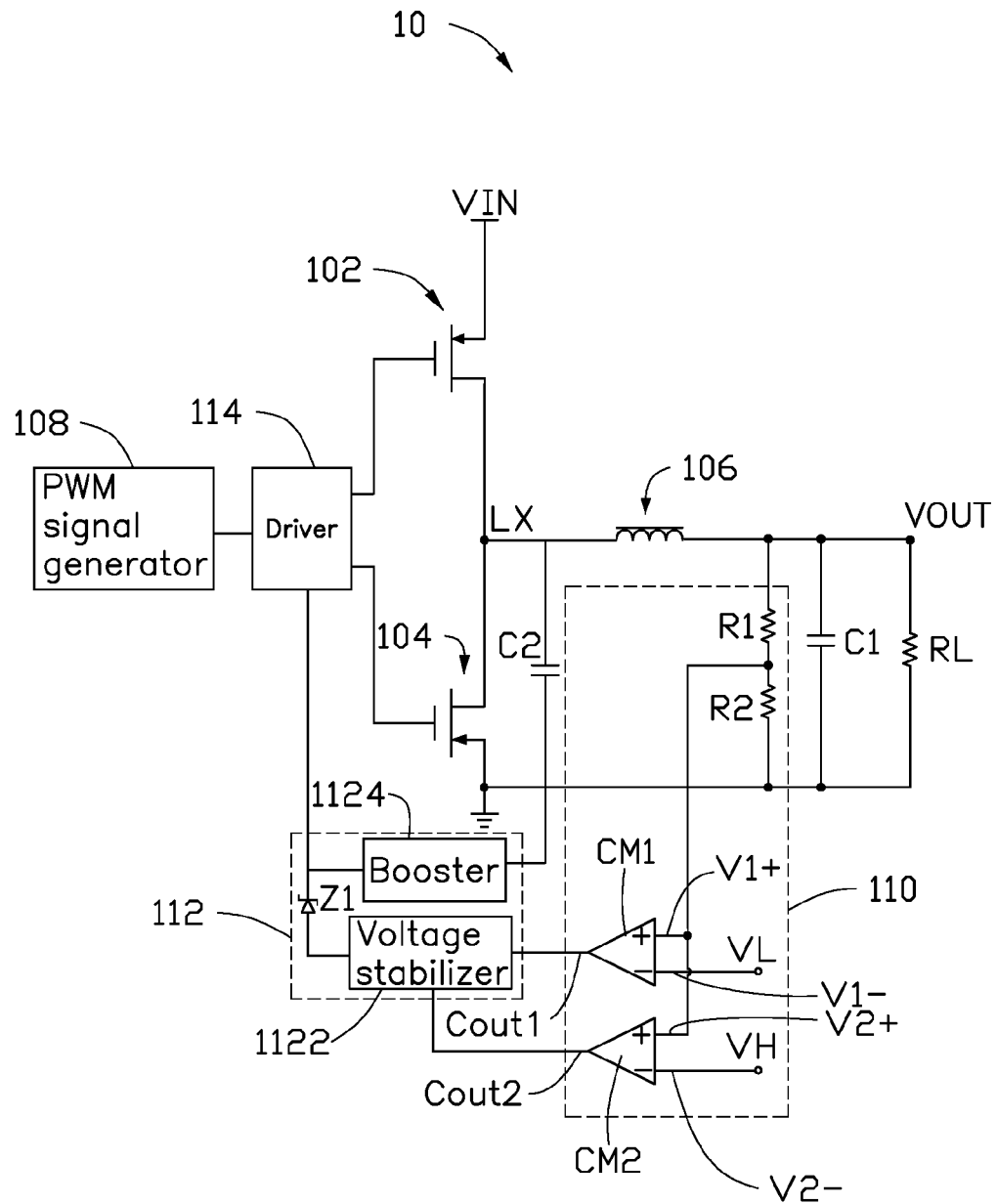
FIG. 1 is a circuit diagram of a power switching voltage regulator according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected.

FIG. 1 shows a circuit diagram of a power switching voltage regulator according to one embodiment. The power switching voltage regulator 10 can include a high-side switch 102, a low-side switch 104, an inductor 106, a pulse width modulation (PWM) generator 108, a detection circuit 110, a gate voltage adjusting unit 112, and a driver 114. In the embodiment, the high-side switch 102 and the low-side switch 104 are both P-metal oxide semiconductor (PMOS) transistors. A source of the high-side switch 102 is electrically coupled to a voltage source VIN. A drain of the high-side switch 102 is electrically coupled to a drain of the low-side switch 104. A source of the low-side switch 104 is grounded. Gates of the high-side switch 102 and the low-side switch 104 are coupled to the PWM generator 108. The PWM generator 108 generates a pulse width modulation (PWM) signal to the driver 114. The driver 114 switches the high-side switch 104 and the low-side switch 106 on or off according to the PWM signal. A node between the drain of the high-side switch 102 and the drain of the low-side switch 104 is a connection node LX. The connection node LX is coupled to a load RL via the inductor 108 and the power output terminal VOUT. The load RL is coupled between the power output terminal VOUT and ground. The power switching voltage regulator 10 can further include a first capacitor C1 coupled between the power output terminal VOUT and the ground.

The detection circuit 10 detects an output voltage of the power output terminal VOUT. The detection circuit 10 can include a first divider resistor R1, a second divider resistor R2, a first comparator CM1 and a second comparator CM2. The first resistor R1 and the second resistor R2 are coupled between the power output terminal VOUT and grounded in series. The first and second comparators CM1 and CM2 can both include a non-inverting input terminal V1+, V2+, an inverting terminal V1−, V2−, and a comparison output terminal Cout1, Cout2. The non-inverting input terminals V1+, V2+ of the first and second comparators CM1 and CM2 are both coupled to a node between the first divider resistor R1 and the second resistor R2. The inverting input terminal V1− of the first comparator CM1 receives a first reference voltage VL; the inverting input terminal V2− of the second comparator CM2 receives a second reference voltage VH. In the embodiment, the second reference voltage VH is larger than the first reference voltage VL.

The gate voltage adjusting unit 112 can include a voltage stabilizer 1122, a zener diode Z1 and a voltage booster 1124. The voltage stabilizer 1122 is coupled to the comparison output terminals Cout1, Cout2 of the first and second comparators CM1 and CM2. The voltage stabilizer 1122 is also coupled to the voltage booster 1124 via the zener diode Z1. The voltage stabilizer 1122 outputs a predetermined voltage corresponding to a detection signal output by the detection circuit 10. The voltage booster 1124 outputs a gate voltage according to the predetermined voltage. The gate voltage includes a gate breakover voltage and a gate cutoff voltage. In the embodiment, the voltage stabilizer 1122 can be a low dropout regulator (LDO).

When the load RL is coupled to the power output terminal VOUT, the inductor 106 supplies power for the load RL and the output voltage Vout is oscillated and has a tendency to decrease. When a dividing voltage of the second divider resistor R2 is less than the first reference voltage VL, that is an input voltage of the non-inverting input terminal V1+ of the first comparator CM1 is less than the first reference voltage VL, the comparison output terminal Cout1 of the first comparator CM1 outputs a first detection signal to the voltage stabilizer 1122. The voltage stabilizer 1122 outputs a first predetermined voltage to the voltage booster 1124. In the embodiment, the first predetermined voltage is 9V. The driver 114 pulls up the gate breakover voltage to 20.5V and the gate cutoff voltage to 8.5 V. As the gate breakover voltage and the gate cutoff voltage are pulled up, on-resistances of the high-side switch 102 and the low-side switch 104 decrease to slow down a decreased tendency of the output voltage Vout to increase a stability of the output voltage Vout.

The driver 114 outputs the gate voltage to the high-side switch 102 and the low-side switch 104 to switch the high-side switch 102 and the low-side switch 104 on or off. The driver 114 controls the high-side switch 102 and the low-side switch 104 to switch on time.

The power switching voltage regulator 10 can further include a second capacitor C2 coupled between the connection node LX and the voltage booster 1124. The second capacitor C2 substains a stable voltage between the connection node LX and the voltage booster 1124.

Figure 2A:
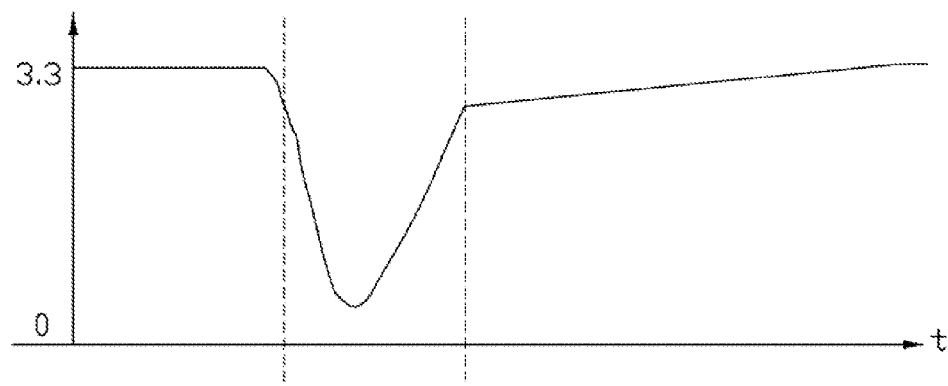
FIG. 2A is a graph showing an output voltage when the power switching voltage regulator of FIG. 1 supplies power for a load.
Figure 2B:
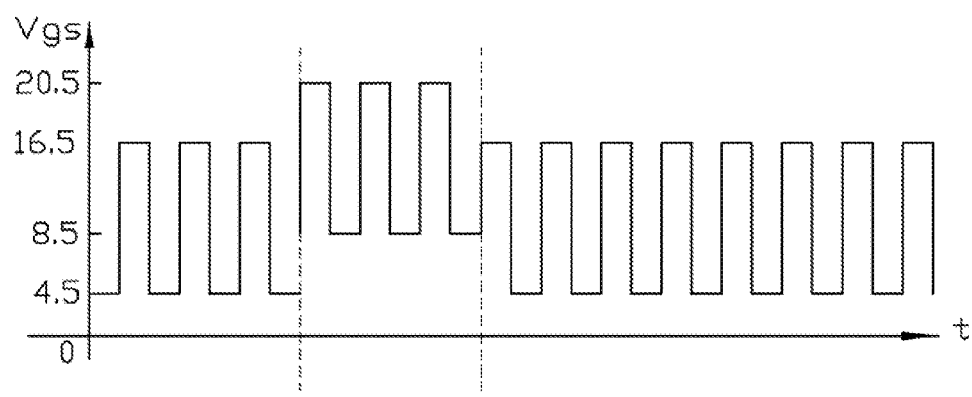
FIG. 2B is a graph showing a gate voltage when the power switching voltage regulator of FIG. 1 supplies power for the load.
Figure 2C:
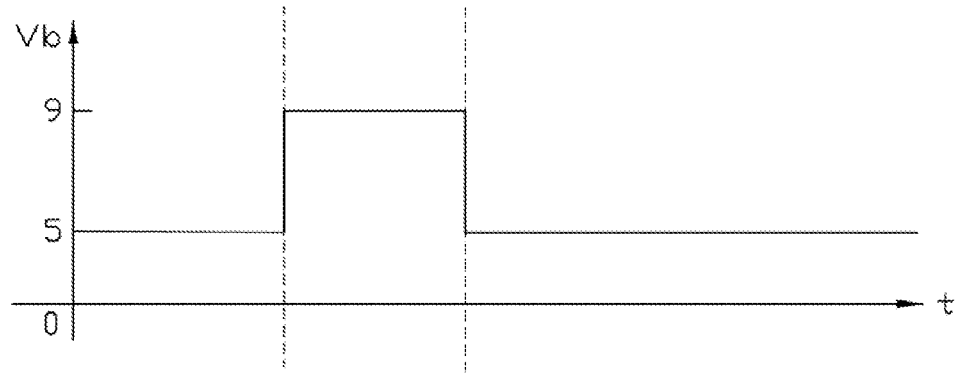
FIG. 2C is a graph showing an initial voltage output by a voltage stabilizer of the power switching voltage regulator of FIG. 1 when the power switching voltage regulator supplies power for the load.

FIG. 2A shows a graph showing an output voltage Vout when the power switching voltage regulator 10 supplies power for a load RL. FIG. 2B is a graph showing a gate voltage Vgs when the power switching voltage regulator 10 supplies power for the load RL. FIG. 2C shows a graph showing an initial voltage Vb output by the voltage stabilizer 1122 when the power switching voltage regulator 10 supplies power for the load. In the embodiment, a voltage of the voltage source VIN is 12V, a voltage of the power output terminal VOUT is 3.3V, an initial voltage Vb of the voltage stabilizer 1122 is 5V. The voltage booster 1124 controls the driver 114 to output the gate breakover voltage Vgs to switch on the high-side switch 102 and the low-side switch 104, wherein the gate breakover voltage is 16.5V. The voltage booster 1124 controls the driver 114 to output the gate cutoff voltage Vgs to switch off the high-side switch 102 and the low-side switch 104, wherein the gate cutoff voltage is 4.5V. The first reference voltage VL and the second reference voltage VH are set according to resistances of the first and second divider resistors R1 and R2. In the embodiment, a ratio of a resistance of the first resistor R1 and the second resistor R2 is 1:2, the first reference voltage VL is 2.15V, and the second reference voltage VH is 2.2V.

When the load RL is coupled to the power output terminal VOUT, the inductor 106 supplies power for the load RL and the output voltage Vout is oscillated and has a tendency to decrease. When a dividing voltage of the second divider resistor R2 is less than the first reference voltage VL, that is an input voltage of the non-inverting input terminal V+ of the first comparator CM1 is less than the first reference voltage VL, the comparison output terminal Cout of the first comparator CM1 outputs a first detection signal to the voltage stabilizer 1122. The voltage stabilizer 1122 outputs a first predetermined voltage to the voltage booster 1124. In the embodiment, the first predetermined voltage is 9V. The driver 114 pulls up the gate breakover voltage to 20.5V and the gate cutoff voltage to 8.5 V. As the gate breakover voltage and the gate cutoff voltage are pulled up, on-resistances of the high-side switch 102 and the low-side switch 104 decrease to slow down a decreased tendency of the output voltage Vout to increase a stability of the output voltage Vout.

When the power switching voltage regulator 10 supplies power for the load RL after a predetermined time, a dividing voltage of the second divider resistor R2 is larger than the first reference voltage VL, that is the input voltage of the non-inverting input terminal V1+ of the first comparator CM1 is larger than the first reference voltage VL, the comparison output terminal Cout1 of the first comparator CM1 outputs a second detection signal. The voltage stabilizer 1122 resets to output the initial voltage, wherein the initial voltage is 5V. The voltage booster 1124 controls the driver 114 to pull down the gate breakover voltage to 16.5 V from 20.5V and the gate cutoff voltage to 4.5 V from 8.5V.

Figure 3A:
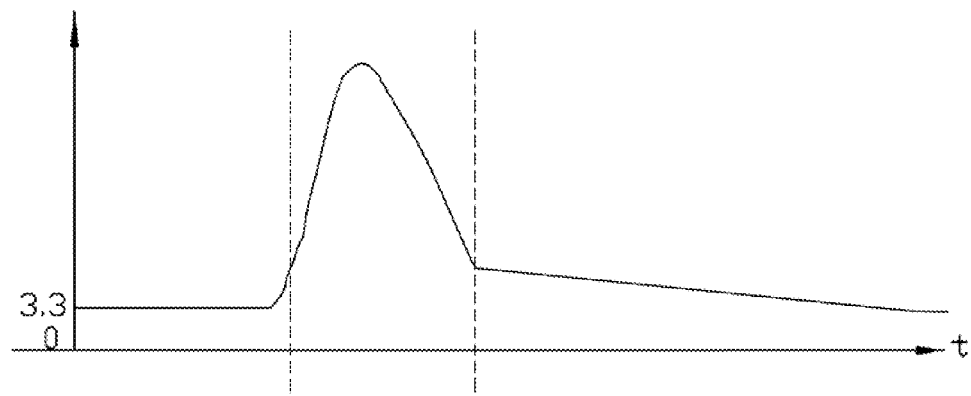
FIG. 3A is a graph showing the output voltage when the load is removed from the power switching voltage regulator of FIG. 1.
Figure 3B:
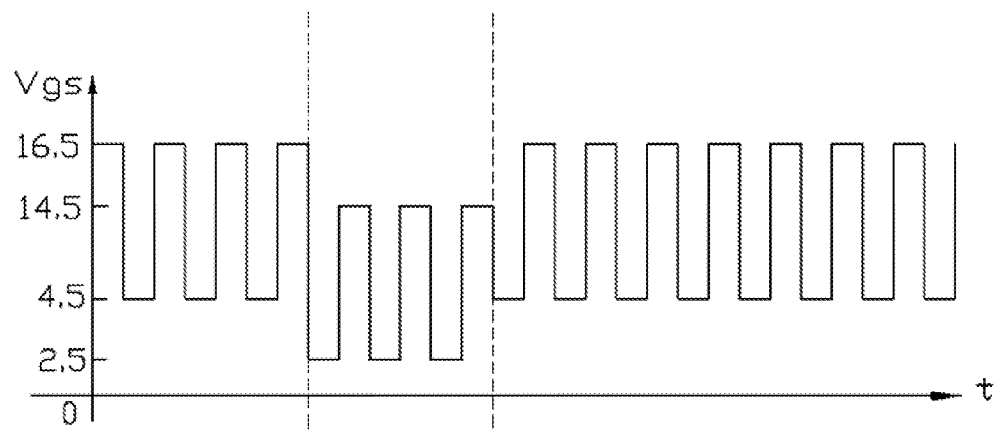
FIG. 3B is a graph showing the gate voltage when the load is removed from the power switching voltage regulator of FIG. 1.
Figure 3C:
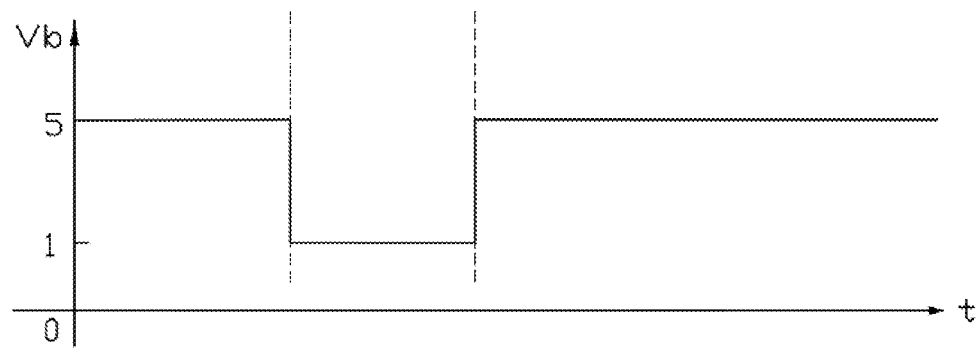
FIG. 3C is a graph showing the initial voltage output by a voltage stabilizer of the power switching voltage regulator of FIG. 1 when the load is removed from the power switching voltage regulator of FIG. 1.

FIG. 3A shows a graph showing an output voltage Vout when the load RL is removed from the power switching voltage regulator 10. FIG. 3B is a graph showing a gate voltage Vgs when the load RL is removed from the power switching voltage regulator 10. FIG. 3C shows a graph showing an initial voltage Vb output by the voltage stabilizer 1122 when the load RL is removed from the power switching voltage regulator 10. When the load RL is removed from the power output terminal VOUT, the output voltage Vout has a tendency to increase. When a dividing voltage of the second divider resistor R2 is larger than the second reference voltage VH, that is an input voltage of the non-inverting input terminal V2+ of the second comparator CM2 is larger than the second reference voltage VH, the comparison output terminal Cout2 of the second comparator CM2 outputs a third detection signal to the voltage stabilizer 1122. The voltage stabilizer 1122 outputs a third predetermined voltage to the voltage booster 124. In the embodiment, the third predetermined voltage is 1V. The driver 114 pulls down the gate breakover voltage to 14.5V and the gate cutoff voltage to 2.5V. As the gate breakover voltage and the gate cutoff voltage are pulled down, on-resistances of the high-side switch 102 and the low-side switch 104 increase to slow down an increased tendency of the output voltage Vout to increase stability of the output voltage Vout.

When the load RL is removed from the power switching voltage regulator 10 after a predetermined time, the dividing voltage of the second divider resistor R2 is less than the second reference voltage VH, that is the input voltage of the non-inverting input terminal V2+ of the second comparator CM2 is larger than the second reference voltage VH, the comparison output terminal Cout2 of the second comparator CM2 outputs a fourth detection signal. The predetermined voltage Vb of the voltage stabilizer 1122 resets to 5V. The voltage booster 1124 controls the driver 114 to pull up the gate breakover voltage to 16.5V from 14.5V and the gate cutoff voltage to 4.5V from 2.5V.

In summary, the power switching voltage regulator 10 adjusts the gate voltage of the high-side switch 102 and the low-side switch 104 dynamically to adjust on-resistances of the high-side switch 102 and the low-side switch 104 improving a stability of the output voltage.

It is to be understood that even though numerous characteristics and advantages of the present embodiments have been set forth in the foregoing description, with details of the structures and functions of the embodiments, the disclosure is illustrative only and changes may be in detail, especially in the matter of arrangement of parts within the principles of the embodiments, to the full extent indicated by the broad general meaning of the terms in which the appended claims are expressed.

What is claimed is:

1. A power switching voltage regulator comprising:
a high-side switch coupled to a voltage source;
a low-side switch coupled between the high-side switch and a ground;
a connection node between the high-side switch and the low-side switch;
an inductor coupled between the connection node and a power output terminal of the power switching voltage regulator;
a pulse width modulation (PWM) generator configured to generate a pulse width modulation signal;
a detection circuit configured to detect an output voltage of the power output terminal, output a first detection signal when a load is connected with the power switching voltage regulator, and output a second detection signal when the load is removed from the power switching voltage regulator;
a gate voltage adjusting unit configured to adjust a gate voltage of the high-side switch and the low-side switch; and
a driver configured to output the adjusted gate voltage to the high-side switch and the low-side switch and control switching-on time both of the high-side switch and the low-side switch;
wherein the gate voltages comprises a gate breakover voltage as an original breakover voltage and a gate cutoff voltage as an original cutoff voltage; the driver outputs the gate breakover voltage and the gate cutoff voltage alternately; the gate adjusting unit pulls up the gate breakover voltage and the gate cutoff voltage based on the first detection signal; the gate adjusting unit pulls down the gate breakover voltage and the gate cutoff voltage based on the second detection signal.

2. The power switching voltage regulator of claim 1, wherein the detection circuit comprises a first divider resistor and a second divider resistor coupled between the power output terminal and the ground in series.

3. The power switching voltage regulator of claim 2, wherein the detection circuit further comprises a first comparator and a second comparator; when the power switching voltage regulator supplies power for the load, the first comparator outputs the first detection signal; and when the load is removed from the power switching voltage regulator, the second comparator outputs the second detection signal.

4. The power switching voltage regulator of claim 3, wherein the first and second comparators comprise a non-inverting terminal, an inverting terminal and a comparison output terminal; the non-inverting input terminals of the first and second comparators are both coupled to a node between the first divider resistor and the second resistor, the inverting input terminal of the first comparator receives a first reference voltage, the inverting input terminal of the second comparator receives a second reference voltage.

5. The power switching voltage regulator of claim 4, wherein the gate voltage adjusting unit comprises a voltage stabilizer, a zener diode, and a voltage booster; the voltage stabilizer is coupled to the comparison output terminal of the first and second comparators, the voltage stabilizer is also coupled to the voltage booster via the zener diode; the voltage stabilizer outputs a predetermined voltage corresponding to the detection signal, and the voltage booster outputs the gate voltage according to the predetermined voltage.

6. The power switching voltage regulator of claim 5, wherein when the load is coupled to the power output terminal, the inductor supplies power for the load and the output voltage is oscillated and has a tendency to decrease; when a dividing voltage of the second divider resistor is less than the first reference voltage, that is an input voltage of the non-inverting input terminal of the first comparator is less than the first reference voltage, the comparison output terminal of the first comparator outputs the first detection signal to the voltage stabilizer, the voltage stabilizer outputs a first predetermined voltage to the voltage booster, the driver pulls up the gate breakover voltage to be greater than the original cutoff voltage and the gate cutoff voltage to be greater than the original cutoff voltage.

7. The power switching voltage regulator of claim 6, wherein when the power switching voltage regulator supplies power for the load after a predetermined time, the dividing voltage of the second divider resistor is larger than the first reference voltage, that is the input voltage of the non-inverting input terminal of the first comparator is larger than the first reference voltage, the comparison output terminal of the first comparator outputs a third detection signal; and the voltage booster controls the driver pulls down the gate breakover voltage to be equal to the original breakover voltage and the gate cutoff voltage to be equal to the original cutoff voltage.

8. The power switching voltage regulator of claim 5, wherein when the load is removed from the power output terminal, the output voltage has a tendency to increase; and when a dividing voltage of the second divider resistor is larger than the second reference voltage, that is an input voltage of the non-inverting input terminal of the second comparator is larger than the second reference voltage, the comparison output terminal of the second comparator outputs the second detection signal to the voltage stabilizer; and the voltage stabilizer outputs a third predetermined voltage to the voltage booster, the driver pulls down the gate breakover voltage to be less than the original breakover voltage and the gate cutoff voltage to be less than the original cutoff voltage.

9. The power switching voltage regulator of claim 8, wherein when the load is removed from the power switching voltage regulator after a predetermined time, the dividing voltage of the second divider resistor is less than the second reference voltage, that is the input voltage of the non-inverting input terminal of the second comparator is less than the second reference voltage, the comparison output terminal of the second comparator outputs a fourth detection signal; and the voltage booster controls the driver pulls up the gate breakover voltage to be equal to the original breakover voltage and the gate cutoff voltage to be equal to the original cutoff voltage.

10. The power switching voltage regulator of claim 1, wherein the driver outputs the gate breakover voltage to switch on the high-side and low-side switches and the gate cutoff voltage to switch off the high-side and low-side switches.

11. A power switching voltage regulator comprising:
a high-side switch coupled to a voltage source;
a low-side switch coupled between the high-side switch and a ground, a connection node between the high-side switch and the low-side switch;
an inductor coupled between the connection node and a power output terminal of the power switching voltage regulator; and
wherein a gate breakover voltage as an original breakover voltage and a gate cutoff voltage as an original cutoff voltage are alternately provided to a gate of the high-side switch and the low-side switch; when a load is connected with the power switching voltage regulator, a gate voltage adjusting unit pulls up the gate breakover voltage and the gate cutoff voltage; when the load is disconnected with the power switching voltage regulator, the gate adjusting unit pulls down the gate breakover voltage and the gate cutoff voltage.

12. The power switching voltage regulator of claim 11, further comprising a detection circuit detecting the output voltage of the power output terminal, wherein the detection circuit comprises a first divider resistor and a second divider resistor coupled between the power output terminal and the ground in series.

13. The power switching voltage regulator of claim 12, wherein the detection circuit further comprises a first comparator and a second comparator; when the power switching voltage regulator supplies power for the load, the first comparator outputs a first detection signal; and when the load is removed from the power switching voltage regulator, the second comparator outputs a second detection signal.

14. The power switching voltage regulator of claim 13, wherein the first and second comparators comprise a non-inverting terminal, an inverting terminal and a comparison output terminal; the non-inverting input terminals of the first and second comparators are both coupled to a node between the first divider resistor and the second resistor, the inverting input terminal of the first comparator receives a first reference voltage, the inverting input terminal of the second comparator receives a second reference voltage.

15. The power switching voltage regulator of claim 14, wherein the gate voltage adjusting unit comprises a voltage stabilizer, a zener diode, and a voltage booster; the voltage stabilizer is coupled to the comparison output terminal of the first and second comparators, the voltage stabilizer is also coupled to the voltage booster via the zener diode; the voltage stabilizer outputs a predetermined voltage corresponding to the detection signal, and the voltage booster outputs the gate voltage according to the predetermined voltage.

16. The power switching voltage regulator of claim 15, wherein when the load is coupled to the power output terminal, the inductor supplies power for the load and the output voltage is oscillated and has a tendency to decrease; when a dividing voltage of the second divider resistor is less than the first reference voltage, that is an input voltage of the non-inverting input terminal of the first comparator is less than the first reference voltage, the comparison output terminal of the first comparator outputs the first detection signal to the voltage stabilizer, the voltage stabilizer outputs a first predetermined voltage to the voltage booster, a driver pulls up the gate breakover voltage to be greater than the original breakover voltage and the gate cutoff voltage to be greater than the original cutoff voltage.

17. The power switching voltage regulator of claim 16, wherein when the power switching voltage regulator supplies power for the load after a predetermined time, the dividing voltage of the second divider resistor is larger than the first reference voltage, that is the input voltage of the non-inverting input terminal of the first comparator is larger than the first reference voltage, the comparison output terminal of the first comparator outputs a third detection signal; and the voltage booster controls the driver pulls down the gate breakover voltage to be equal to the original breakover voltage and the gate cutoff voltage to be equal to the original cutoff voltage.

18. The power switching voltage regulator of claim 15, wherein when the load is removed from the power output terminal, the output voltage has a tendency to increase; and when a dividing voltage of the second divider resistor is larger than the second reference voltage, that is an input voltage of the non-inverting input terminal of the second comparator is larger than the second reference voltage, the comparison output terminal of the second comparator outputs the second detection signal to the voltage stabilizer; and the voltage stabilizer outputs a third predetermined voltage to the voltage booster, a driver pulls down the gate breakover voltage to be less than the original breakover voltage and the gate cutoff voltage to be less than the original cutoff voltage.

19. The power switching voltage regulator of claim 18, wherein when the load is removed from the power switching voltage regulator after a predetermined time, the dividing voltage of the second divider resistor is less than the second reference voltage, that is the input voltage of the non-inverting input terminal of the second comparator is less than the second reference voltage, the comparison output terminal of the second comparator outputs a fourth detection signal; and the voltage booster controls the driver pulls up the gate breakover voltage to be equal to the original breakover voltage and the gate cutoff voltage to be equal to the original cutoff voltage.

20. The power switching voltage regulator of claim 11, wherein a driver outputs the gate breakover voltage to switch on the high-side and low-side switches and the gate cutoff voltage to switch off the high-side and low-side switches.

* * * * *